United States Patent [19]

Wicki et al.

[11] 4,169,832
[45] Oct. 2, 1979

[54] DISAZO AND TRISAZO INTERMEDIATES FOR POLYAZO DYES CONTAINING A STILBENYL OR 2,2'-DISULFOSTILBENYL RADICAL

[75] Inventors: Heinz Wicki, Basel, Switzerland; Claude Vogel, Saint-Louis, France

[73] Assignee: Sandoz Ltd., Basel, Switzerland

[21] Appl. No.: 885,627

[22] Filed: Mar. 13, 1978

Related U.S. Application Data

[63] Continuation-in-part of Ser. No. 717,522, Aug. 25, 1976.

[30] Foreign Application Priority Data

Sep. 5, 1975 [CH] Switzerland .................. 11590/75

[51] Int. Cl.$^2$ .................. C09B 33/10; C09B 33/12; C09B 33/16; C09B 33/18
[52] U.S. Cl. .................. 260/169; 260/155; 260/159; 260/160; 260/166; 260/173; 260/176; 260/185; 260/186; 260/187
[58] Field of Search .................. 260/169, 173, 185, 186, 260/187

[56] References Cited

U.S. PATENT DOCUMENTS

| | | | |
|---|---|---|---|
| 2,056,539 | 10/1936 | Schindhelm et al. | 260/169 X |
| 2,228,415 | 1/1941 | Sparks et al. | 260/166 X |
| 2,488,076 | 11/1949 | Bossard | 260/166 |
| 2,636,030 | 4/1953 | Keller | 260/148 |
| 2,749,333 | 6/1956 | Kappeler et al. | 260/166 |
| 2,871,230 | 1/1959 | Huss et al. | 260/144 |
| 2,885,391 | 5/1959 | Huss et al. | 260/144 |
| 3,759,892 | 9/1973 | Wicki | 260/145 C |
| 4,003,885 | 1/1977 | Vogel et al. | 260/166 |
| 4,006,130 | 2/1977 | Ditzer et al. | 260/173 |

FOREIGN PATENT DOCUMENTS

| | | | |
|---|---|---|---|
| 817381 | 1/1975 | Belgium | 260/166 |
| 933582 | 9/1955 | Fed. Rep. of Germany | 260/166 |
| 1123473 | 9/1956 | France | 260/169 |
| 1147224 | 11/1957 | France | 260/166 |
| 2253790 | 7/1975 | France | 260/169 |
| 50-62226 | 5/1975 | Japan | 260/169 |
| 335783 | 3/1959 | Switzerland | 260/166 |

*Primary Examiner*—Floyd D. Higel
*Attorney, Agent, or Firm*—Gerald D. Sharkin; Richard E. Vila; Melvyn M. Kassenoff

[57] ABSTRACT

Disclosed are compounds of the formula,

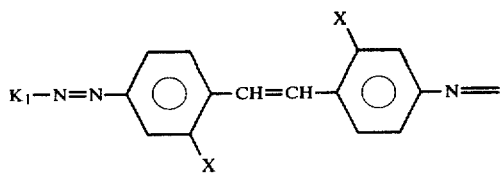

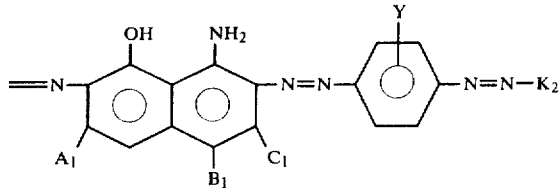

wherein
the X's are the same and are hydrogen or —SO$_3$M,
Y is hydrogen, C$_{1-4}$alkyl, C$_{1-4}$alkoxy, hydroxy, halogen, —COOM or —SO$_3$M,
K$_1$ and K$_2$ are the same or different and are both radicals of a coupling component,
either A$_1$ is —SO$_3$M and one of B$_1$ and C$_1$ is —SO$_3$M, the other being hydrogen,
or A$_1$ and C$_1$ are both hydrogen and B$_1$ is —SO$_3$M, and
M is hydrogen or a non-chromophoric cation, their production and use in dyeing anionic dyeable substrates, for example, natural and regenerated cellulose, natural and synthetic polyamides, polyurethanes, polypropylene modified to contain basic groups, anodized aluminum, paper and, particularly, leather. The dyes are well-soluble in water, possess good resistance to acid, have relatively high substantivity especially to paper and leather and give good penetration dyeings with leather.

Compounds of the formula

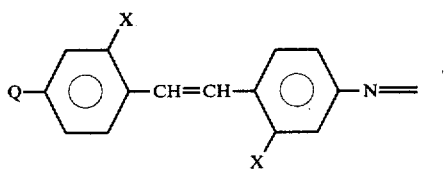

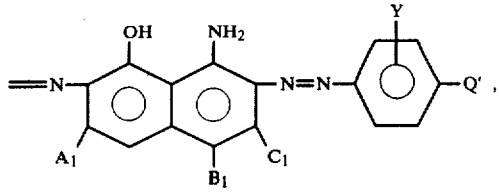

wherein
Q is —NH$_2$, —NO$_2$, acylamino or K$_3$—N=N—, wherein K$_3$ is a coupling component radical free of diazotizable amino groups,
Q is —NH$_2$, —NO$_2$, acylamino or —N=N—K$_4$, wherein K$_4$ is a coupling component radical free of diazotizable amino groups,
with the proviso that when Q is K$_3$—N=N—, Q' is amino, nitro or acylamino, and
A$_1$, B$_1$, C$_1$, each X and Y are as defined above, are useful as intermediates in the synthesis of the polyazo compounds.

12 Claims, No Drawings

DISAZO AND TRISAZO INTERMEDIATES FOR POLYAZO DYES CONTAINING A STILBENYL OR 2,2'-DISULFOSTILBENYL RADICAL

This application is a continuation-in-part of our pending application Ser. No. 717,522, filed Aug. 25, 1976.

The invention provides compounds of formula I,

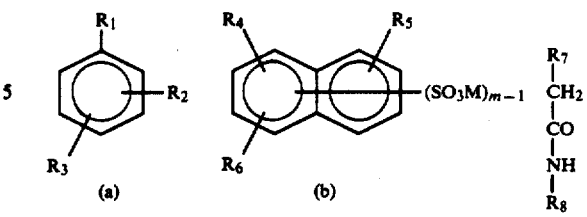

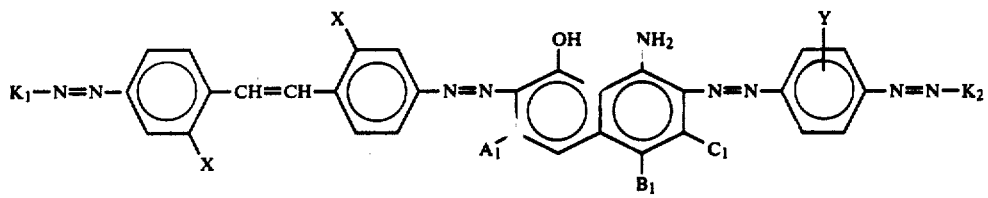

wherein
- the X's are the same and are hydrogen or —$SO_3M$,
- Y is hydrogen, $C_{1-4}$alkyl, $C_{1-4}$alkoxy, hydroxy, halogen, —COOM or —$SO_3M$,
- $K_1$ and $K_2$ are the same or different and are both radicals of a coupling component,
- either $A_1$ is —$SO_3M$ and one of $B_1$ and $C_1$ is —$SO_3M$, the other being hydrogen,
- or $A_1$ and $C_1$ are both hydrogen and $B_1$ is —$SO_3M$, and
- M is hydrogen or a non-chromophoric cation.

The X's are preferably —$SO_3M$ groups. Any halogen as Y is chlorine, bromine or fluorine, chlorine being preferred. Any alkyl or alkoxy as Y is preferably of 1 or 2 carbon atoms, methyl and methoxy being especially preferred. Y is preferably hydrogen, chlorine or —$SO_3$, any chlorine or —$SO_3M$ preferably being in meta-position to the azo-$K_2$ linkage. In the preferred compounds of formula I, $A_1$ is —$SO_3M$ and, of $B_1$ and $C_1$, $C_1$ is preferably —$SO_3M$.

Where M is a non-chromophoric cation, the exact nature thereof is not critical and it may, for example, be any cation conventional in the anionic dyestuff art. As examples may be given the alkali metal, alkaline earth metal and optionally substituted ammonium cations, the preferred of which latter cations can conveniently be represented by the formula $\oplus N(R)_4$, wherein each R, independently, is hydrogen, $C_{1-3}$alkyl or $C_{2-3}$hydroxyalkyl, with the provisos that (i) where one or more R is hydroxyalkyl, at least one is hydrogen, and (ii) in any hydroxyalkyl, the hydroxy group is other than on the carbon atom attached to the nitrogen. As specific examples of cations may be given the triethylammonium, tri- and tetra-methylammonium, mono-, di- and tri-ethanol- and -isopropanolammonium, unsubstituted ammonium, potassium, lithium and sodium cations. From the production standpoint, alkali metal, especially sodium, cations are preferred.

The radicals $K_1$ and $K_2$ are conveniently derived from any coupling component conventional in the anionic dyestuff art, especially from those conventionally employed as terminal coupling components in polyazo anionic dyes. They are preferably free from azo linkages. The preferred coupling components from which the radicals $K_1$ and $K_2$ are derived are $K_1'$—H and $K_2'$—H, i.e. those of formulae (a) to (e),

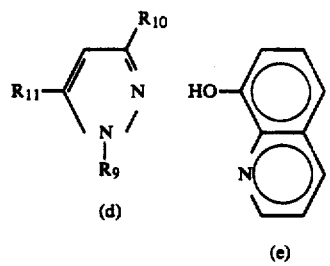

wherein
- $R_1$ is hydroxy or a primary, secondary or tertiary amino group conventional in coupling component radicals, preferably —OH, —$NH_2$, mono- or di-$C_{1-4}$alkylamino, mono- or di-$C_{2-4}$hydroxyalkylamino, mono-sulphomethylamino, monoarylamino, N—$C_{1-4}$-alkyl-N—$C_{2-4}$hydroxyalkylamino, N—$C_{1-4}$alkyl-N-arylamino or N—$C_{2-4}$hydroxyalkyl-N-arylamino, any aryl being naphthyl, unsubstituted or mono- or di-substituted by —$SO_3M$, or phenyl, unsubstituted or substituted by up to 3 substituents selected from $C_{1-4}$alkyl (max.3), $C_{1-4}$alkoxy(max.2), nitro(max.2), chlorine(max.2), —COOM(max.1) and —$SO_3M$(max.1),
- $R_2$ is hydrogen, hydroxy, —$NH_2$, $C_{1-4}$alkyl, $C_{1-4}$alkoxy, chlorine or acylamino, where acyl is any conventional acyl group in coupling component radicals, preferably phenylsulphonyl, tolylsulphonyl, phenylcarbonyl, $C_{1-4}$-alkylcarbonyl or methylcarbonylmethylcarbonyl (acetoacetyl),
- $R_3$ is hydrogen, $C_{1-4}$alkyl, —$SO_3M$ or —COOM,
- $R_4$ is —OH, —$NH_2$ or phenylamino, the phenyl being unsubstituted or substituted by $C_{1-4}$-alkyl and/or $C_{1-4}$alkoxy groups, preferably by up to 3 substituents selected from $C_{1-4}$-alkyl(max.3) and $C_{1-4}$alkoxy(max.2),
- $R_5$ is hydrogen, —OH, —$NH_2$, —$NHCH_2SO_3M$ or acylamino, acyl being as above defined,
- m is 1, 2 or 3,
- $R_6$ is hydrogen, $C_{1-4}$alkoxy, or —COOM, being —COOM only when m is 1,
- $R_7$ is acyl, as defined above,
- $R_8$ is naphthyl, unsubstituted or mono- or disubstituted by —$SO_3M$, or phenyl, unsubstituted or substituted preferably by up to three substituents selected from $C_{1-4}$alkyl(max.3), $C_{1-4}$alkoxy(max.2), chlorine(max.2), methylcarbonyl(max.1) and —SO$_3$M(max.1), R$_9$ is hydrogen or phenyl, unsubstituted or monosubstituted by —SO$_3$M, R$_{10}$ is C$_{1-4}$alkyl or —COOM, and R$_{11}$ is —OH or —NH$_2$, and those coupling components, designated (fg), being the product of condensation, under acid conditions, of a compound or mixture of compounds of formula (f),

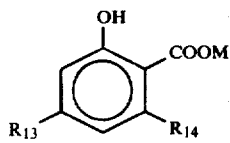

and/or a compound or mixture of compounds of formula (g),

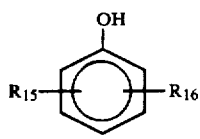

R$_{13}$ to R$_{16}$, independently, being hydrogen, halogen, hydroxy or optionally substituted alkyl or alkoxy, and M is as defined above, with formaldehyde, the mol ratio of formaldehyde to the other compound(s) being at least 0.5:1, and at least 50 mol % of the other compound(s) containing a —COOM group.

In any C$_{1-4}$alkyl substituted amino group as R$_1$, the alkyl group is preferably of 1 or 2 carbon atoms and in any C$_{2-4}$hydroxyalkyl substituted amino group, the hydroxy group is other than on the α-carbon atom, preferably being on the β-carbon atom, the preferred C$_{2-4}$hydroxyalkyl groups being C$_{2-3}$hydroxyalkyl, especially β-hydroxyethyl. The preferred aryls in any aryl substituted amino group as R$_1$ are the unsubstituted and substituted phenyl radicals, in which any alkyl or alkoxy substituent is preferably methyl or methoxy, especially preferred arylamino groups as R$_1$ being of formula (ax),

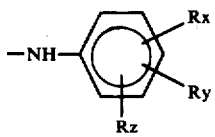

wherein

Rx is hydrogen, —NO$_2$ or methyl,

Ry is hydrogen, —NO$_2$ or —SO$_3$M, and

Rz is hydrogen, —COOM or methyl, where two or more substituents selected from —NO$_2$, —COOM and —SO$_3$M are present, such preferably being in meta-positions relative to each other, particularly preferred arylaminos as R$_1$ being ortho-tolylamino, phenylamino, 2-nitro-4-sulphophenylamino and 2-sulpho-4-nitrophenylamino.

The acyl as R$_7$ or in any acylamino as R$_2$ is preferably C$_{1-4}$alkylcarbonyl, more preferably methylcarbonyl.

The phenyl, in any phenylamino as R$_4$, is preferably unsubstituted or mono- or di-, preferably mono-, substituted by methyl or methoxy.

Any C$_{1-4}$alkyl or C$_{1-4}$alkoxy on any phenyl as R$_8$ is preferably methyl or methoxy, respectively, the preferred phenyl significance of R$_8$ being unsubstituted phenyl and tolyl.

R$_1$ is preferably R$_{21}$, i.e. —OH, —NH$_2$, —N(CH$_3$)$_2$, —N(C$_2$H$_5$)$_2$, —N(C$_2$H$_4$OH)$_2$, —NHCH$_2$SO$_3$M or monophenylamino (anilino), the phenyl group being unsubstituted or substituted by up to 3 substituents selected from methyl(max.3), methoxy(max.2), nitro(max.2), chlorine(max.2), —COOM(max.1) and —SO$_3$M(max.1), the preferred phenylamino being of formula (ax) above. More preferably, R$_1$ is R$_{31}$, i.e. —OH, —NH$_2$, ortho-tolylamino, phenylamino, 2-nitro-4-sulphophenylamino, 2-sulpho-4-nitrophenylamino, —N(C$_2$H$_4$OH)$_2$ or —N(C$_2$H$_5$)$_2$.

R$_1$ and R$_2$ are preferably ortho or meta to each other and when both are —OH, especially meta.

When R$_2$ is position meta position to R$_1$, it is preferably R$_{22}$, i.e. hydrogen, —OH, C$_{1-4}$ (preferably C$_1$ or $_2$)alkyl, —NH$_2$ or —NHCOCH$_3$, more preferably R$_{32}$, i.e. hydrogen, methyl, ethyl, —NH$_2$ or —NHCOCH$_3$.

When R$_2$ is position ortho position to R$_1$, R$_1$ is preferably R$_{21}$, as given above, more preferably R$_{41}$, i.e. —OH, —NH$_2$, —NHCH$_2$SO$_3$M or —N(C$_2$H$_5$)$_2$, and R$_2$ is preferably R$_{20}$, i.e. hydrogen, C$_{1-4}$alkyl, C$_{1-4}$alkoxy, chlorine or acetylamino, more preferably R$_{30}$, i.e. hydrogen, methyl, methoxy or acetylamino, preferably up to a maximum of one of R$_{20}$ or R$_{30}$ and R$_{21}$ or R$_{41}$ containing a nitrogen atom.

R$_3$, when R$_1$ and R$_2$ are meta one to the other, is preferably para to R$_1$ and is preferably R$_{23}$, i.e. hydrogen, C$_{1-4}$alkyl or —SO$_3$M, more preferably R$_{33}$, i.e. hydrogen, methyl or —SO$_3$M, but —SO$_3$M only when R$_1$ and R$_2$ are both —NH$_2$.

R$_3$, when R$_1$ and R$_2$ are ortho one to the other and R$_1$ is hydroxy, is preferably R$_{43}$, i.e. C$_{1-4}$alkyl (preferably methyl) or —COOM, the latter group being ortho to the hydroxy group as R$_1$.

R$_3$, when R$_1$ and R$_2$ are ortho one to the other and R$_1$ is an amino group, is preferably hydrogen.

When R$_2$ is hydrogen, R$_3$ is preferably other than hydrogen and, in the case when R$_2$ is hydrogen, R$_1$ is preferably hydroxy, R$_3$ being ortho thereto.

R$_4$ is preferably R$_{24}$, i.e. hydroxy, —NH$_2$ and, when R$_5$ is hydrogen or hydroxy, additionally phenylamino, the phenyl being unsubstituted or substituted by up to two substituents selected from methyl and methoxy, preferably being unsubstituted or monosubstituted by methyl or methoxy and more preferably being unsubstituted.

R$_5$ is preferably R$_{25}$, i.e. hydrogen, hydroxy, —NH$_2$ and, when R$_4$ is hydroxy, additionally tolylsulfonylamino, benzamido methylcarbonylamino (acetamido) or C$_{1-4}$alkylcarbonylamino, preferably and, when R$_4$ is hydrogen or hydroxy, also —NHCH$_2$SO$_3$M.

Preferably, at least one of R$_5$ and R$_6$ is hydrogen.

When formula (b) contains two —SO$_3$M groups they are preferably not in ortho relative positions.

Preferably, R$_6$ is C$_{1-4}$alkoxy (of which methoxy is preferred) only when R$_5$ is hydrogen and m is 2.

Preferably, R$_6$ is R$_{26}$, i.e. hydrogen, methoxy or —COOM, being methoxy only when R$_5$ is hydrogen and m is 2 and being —COOM only when R$_5$ is hydrogen and m is 1. Most preferably R$_6$ is hydrogen.

$R_7$ is preferably $R_{27}$, i.e. $C_{1-4}$alkylcarbonyl, more preferably methylcarbonyl.

$R_8$ is preferably $R_{28}$, i.e. phenyl, unsubstituted or substituted by up to 3 substituents selected from $C_{1-4}$alkyl (preferably methyl) (max.3), $C_{1-4}$alkoxy (preferably methoxy) (max.2), chlorine (max.2), methylcarbonyl (max.1) and —$SO_3M$ (max.1), more preferably $R_{38}$, i.e. methylphenyl or unsubstituted phenyl, of which the latter is especially preferred.

$R_9$ is preferably $R_{29}$, i.e. phenyl or monosulphophenyl.

$R_{10}$ is preferably $R_{210}$, i.e. methyl or —COOM, more preferably methyl.

$R_{11}$ is preferably hydroxy.

Preferred compounds of formula (a) are those of formulae ($a_1$) and ($a_2$)

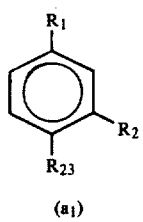
($a_1$)

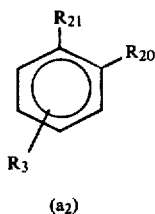
($a_2$)

particularly ($a_{11}$) and ($a_{12}$)

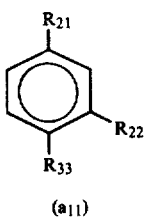
($a_{11}$)

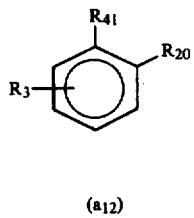
($a_{12}$)

more particularly ($a_{21}$) and ($a_{22}$)

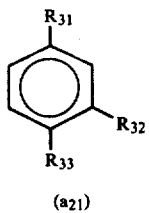
($a_{21}$)

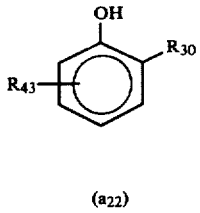
($a_{22}$)

Preferred compounds of formula (b) are those of formula ($b_1$), particularly ($b_2$) and more particularly ($b_3$),

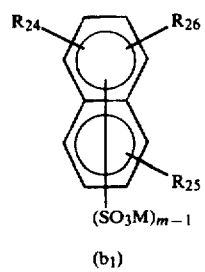
($b_1$)

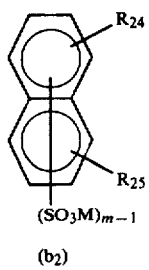
($b_2$)

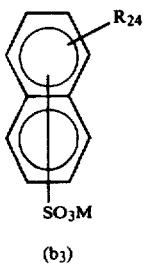
($b_3$)

Preferred compounds of formula (c) are those of formula ($c_1$), particularly ($c_2$) and more particularly ($c_3$)

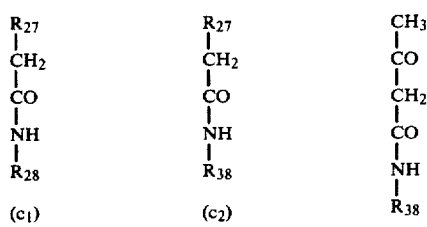

Preferred compounds of formula (d) are those of formula ($d_1$), particularly ($d_2$) and more particularly ($d_3$)

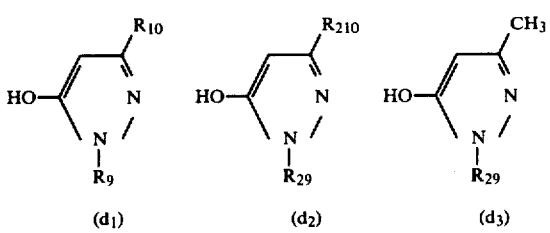

As regards the coupling component (fg), in the compounds of formulae (f) and (g), any alkyl or alkoxy radical is preferably of 1 to 4 carbon atoms, more preferably of 1 or 2 carbon atoms, except as stated below. As examples of substituents thereon may be given halogen, —COOM, cyano, hydroxy, $C_{1-4}$alkoxy and hydroxy-($C_{1-4}$)-alkoxy. Any alkoxy substituted by one of the last three mentioned substituents is preferably of at least 2 carbon atoms. Any halogen in the compounds of formulae (f) and (g) is preferably chlorine, but may also be fluorine, bromine or iodine.

The preferred significances of $R_{13}$, $R_{14}$ and $R_{16}$ are hydrogen, methyl, methoxy, hydroxy and chlorine, such, together with —O—$CH_2$—COOM, being the preferred significances of $R_{15}$. At least one of $R_{13}$ and $R_{14}$ is preferably hydrogen. Most preferably, $R_{13}$, $R_{14}$ and $R_{15}$ are hydrogen. Most preferably, $R_{16}$ is methyl or a hydroxy group in meta-position to the hydroxy shown in formula (g).

As examples of compounds of formula (f) may be given salicylic, m-cresotic, 2,4- and 2,6-dihydroxybenzoic and 4-chloro-2-hydroxybenzoic acids and salts thereof, salicylic acid and salts thereof being particularly preferred.

As examples of compounds of formula (g) may be given phenol, resorcinol, o- or p-cresol, o- and p-chlorophenol, 3-methoxyphenol and 3-hydroxyphenoxyacetic acid.

In the production of coupling components (fg), where mixtures of both compounds of formula (f) and compounds of formula (g) are employed, such mixtures preferably contain at least 50 mol %, more preferably at least 80 mol %, of the compound(s) of formula (f), it being still more preferable to employ solely the compound(s) of formula (f). In the most preferred embodiment, the reaction is carried out solely between salicylic acid and formaldehyde.

The mol ratio of formaldehyde to the compound(s) of formula (f) or (g) is preferably no greater than 0.95:1, the preferred mol ratio being the range of from 0.7 to 0.9:1.

If desired, the formaldehyde may be produced in situ, e.g. using paraformaldehyde, the amount of formaldehyde liberating agent being chosen, however, such that the required amount of formaldehyde is liberated. It is preferred, in fact, to work with paraformaldehyde.

The condensation is conveniently carried out in aqueous medium, in aqueous/inert organic medium or in inert organic medium, suitable organic media being formic and acetic acids. It is preferred, however, to work in aqueous medium. Elevated temperatures are generally employed, preferably from 50° to 130° C., more preferably temperatures close to the boiling point of the reaction medium, e.g. 90° to 130° C., and optionally under pressure. Mineral acids may be employed, as desired, to create the acid conditions for the reaction. However, where the compounds of formula (f) or (g) are employed in free acid form, the acidity thereof is generally sufficient. Where mixtures of compounds of formula (f) and/or (g) are employed and one component compound of the mixture is markedly more reactive than the other(s), such compound is preferably added slowly over the course of the condensation reaction, conveniently dissolved in an inert solvent.

The resulting product may be isolated in conventional manner.

The product of the condensation is a mixture of a broad spectrum of oligomerous condensates and is used as such, without separation of the various oligomers.

The preferred coupling components (fg) are those which are soluble to at least 10% in water at neutral pH.

Those products obtained from the reaction of salicylic acid, or its salts, and formaldehyde are preferred which have a Z value, where $Z = I(CH_2)/I(aromatic)$, where $I(CH_2)$ is intensity of the signal of methylene protons appearing between 3.0–4.3 ppm, and I(aromatic) is intensity of the signal of aromatic protons appearing between 6.3 and 8.2 ppm, (both measured by means of the NMR spectrum at 60 MHz in dimethyl sulphoxide/$D_2O$) of from 0.43 to 0.85, more preferably from 0.5 to 0.7.

The course of the condensation can be followed chromatographically and the end of reaction ascertained by the loss of odour of formaldehyde from the reaction mixture when the formaldehyde is not employed in excess.

The preferred coupling component (fg) is (fg$_1$), i.e. the product of condensation, under acid conditions, of salicylic acid, or a salt thereof, and, optionally, resorcinol or a cresol, with formaldehyde, the mol ratio of formaldehyde to the other component(s) being from 0.6:1 to 0.95:1, preferably 0.7:1 to 0.9:1, at least 80 mol % of the other components being salicylic acid or a salt thereof.

The most preferred coupling component (fg) is (fg$_2$), i.e. (fg$_1$), above, but in which the formaldehyde is condensed with salicylic acid, or a salt thereof, alone.

Representative of the coupling components from which $K_1$ and $K_2$ are derived are $K_1''H$ and $K_2''H$, i.e. compounds of the formulae

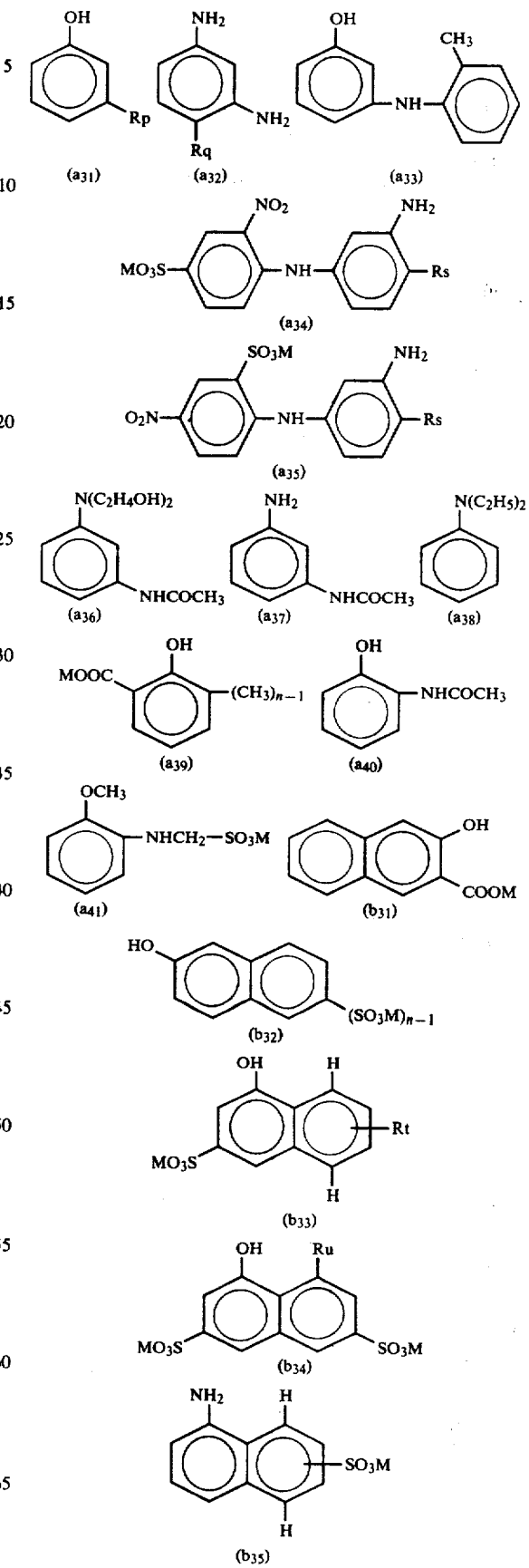

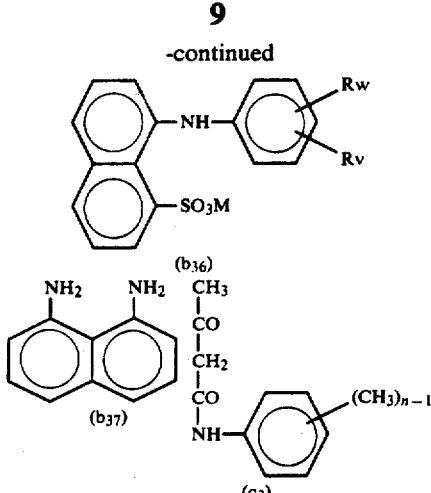

and coupling components (fg$_1$), preferably (fg$_2$), as defined above.

In the most preferred compounds provided by the invention, the radicals K$_1$ and K$_2$ are derived from coupling components K$_1'''$ and K$_2'''$, i.e. compounds (a$_{21}$), (a$_{22}$), (b$_3$), (c$_3$), (d$_3$), (e) and (fg$_1$), (fg$_1$) preferably being (fg$_2$), as defined above.

In general, but depending on the nature of the radicals K$_1$ and K$_2$, i.e. the number of aromatic nuclei contained therein and the presence or otherwise of carboxy groups, the compounds of formula I contain from 3 to 9, preferably at least 4 sulpho groups.

The invention also provides a process for the production of compounds of formula I, comprising (a) coupling the diazo derivative of a diamine of formula II,

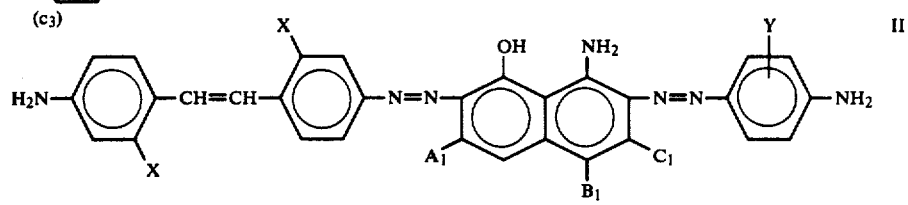

with a coupling component K$_1$H and a coupling component K$_2$H, in any desired order, (b) obtaining a compound of formula I, in which K$_1$ is free from diazotisable amino groups by coupling the diazo derivative of an amine of formula III,

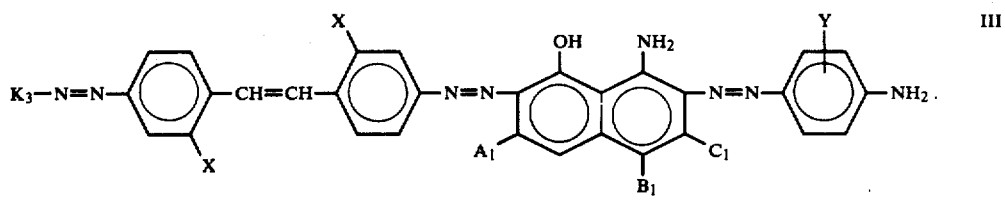

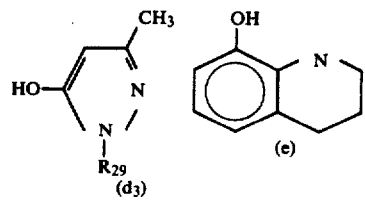

in which

Rp is hydrogen, —OH, —NH$_2$, —N(C$_2$H$_5$)$_2$, —CH$_3$, —C$_2$H$_5$ or unsubstituted phenylamino,
Rq is hydrogen, —CH$_3$ or —SO$_3$M,
Rs is hydrogen or —CH$_3$,
Rt is —NH$_2$, —NHCOCH$_3$, unsubstituted phenylamino or —NH—CH$_2$—SO$_3$M,
Ru is —OH, —NH$_2$ or —NHCOCH$_3$,
Rw is —CH$_3$ or hydrogen, preferably hydrogen,
Rv is hydrogen, —CH$_3$ or —OCH$_3$, and
n is 1 or 2 in which K$_3$ is the radical of a coupling component and is free from diazotisable amino groups, with a coupling component K$_2$H, or (c) obtaining a compound of formula I, in which K$_2$ is free from diazotisable amino groups, by coupling the diazo derivative of an amine of formula IV,

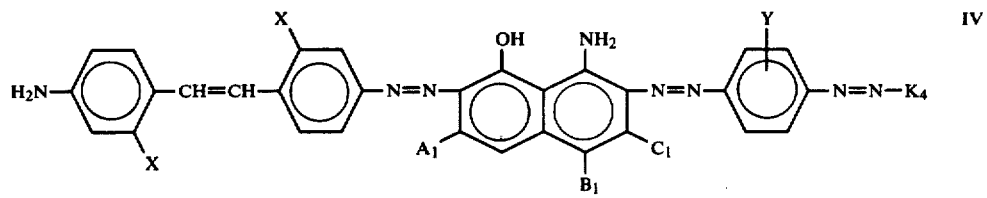

in which K$_4$ is the radical of a coupling component and is free from diazotisable amino groups, with a coupling component K$_1$H.

The above processes may be carried out in conventional manner, process (a) being particularly suitable for production of single compounds of formula I in which K$_1$ and K$_2$ are the same and for the production of mixtures of compounds in which K$_1$ and K$_2$ are different, processes (b) and (c) being particularly suitable for the production of single compounds in which $K_1$ and $K_2$ are different.

Coupling with a component (fg), (fg$_1$) or (fg$_2$) is carried out in a strongly alkaline aqueous or aqueous/organic medium, the pH preferably being at least 10, more preferably at least 12. Low temperatures, e.g. from $-10°$ to $30°$ C., preferably $0°$ to room temperature are employed. As examples or organic media can be given, for example, alcohols, tertiary aliphatic amines and amides.

Where a coupling component (fg$_1$) or (fg$_2$) is employed, there is a preferred ratio between the number of molecules of salicylic acid initially employed in the condensation reaction and the number of diazonium groups in the diazo derivatives compounds II to IV, such ratio being from 1 to 4:1, preferably 1 to 3:1.

The resulting compounds of formula I may be isolated and purified in conventional manner.

The compounds of formula II may be obtained by subjecting a compound of formula IX,

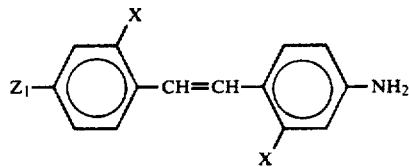

with a compound of formula XII,

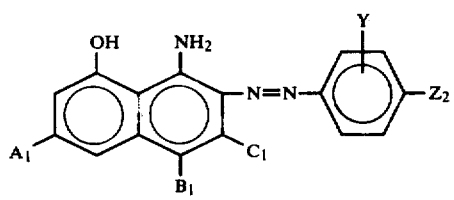

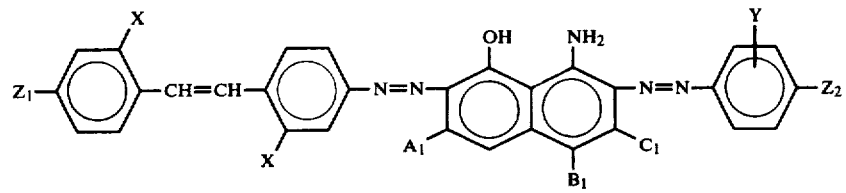

The compounds of formulae III and IV may be obtained by subjecting, respectively, compounds of formulae V and VI, in which
$Z_1$ is $-NO_2$ or an acylamino group, and

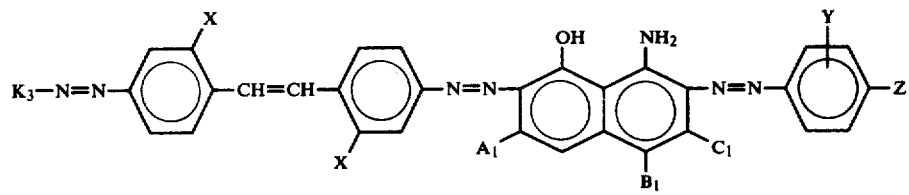

$Z_2$ is $-NH_2$, $-NO_2$ or an acylamino group, wherein Z is nitro or acylamino,

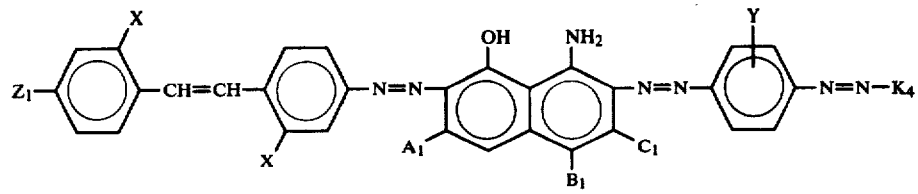

to reducing conditions when $Z_1$ and/or $Z_2$ is $-NO_2$ and/or to deacylation conditions when $Z_1$ and/or $Z_2$ is acylamino.

The compounds of formula IX may be obtained by coupling the diazo derivative of an amine of formula XI to reducing conditions, when Z or $Z_1$ is nitro, or to deacylating conditions, when Z or $Z_1$ is acylamino.

The compounds of formulae V and VI may be obtained by coupling, respectively, to a coupling component $K_3$—H or $K_4$—H compounds of diazo derivatives of amines of formula VII or VIII,

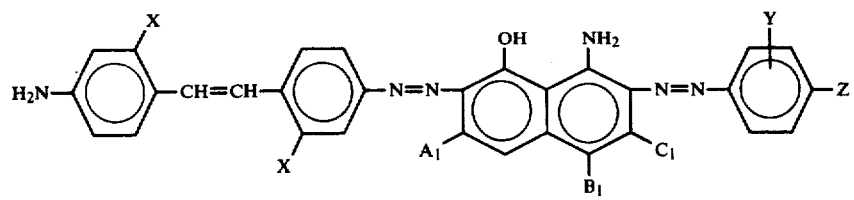

-continued

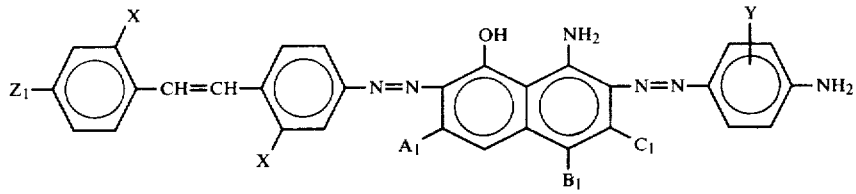

The compounds of formula VII can be obtained from corresponding compounds in which instead of the terminal amino group there is a nitro or acylamino group by reduction or deacylation thereof, respectively, provided that when such group is nitro, Z is acylamino and when such group is acylamino, Z is nitro. The starting materials for such process and the compounds of formula VIII fall, of course, under formula IX.

The compounds of formulae XI and XII are either known or may be obtained from available starting materials in manner analogous to that for the known compounds.

The above reactions are carried out in conventional manner, e.g. reduction of nitro groups to amino groups by employing sodium sulphide as reducing agent and deacylation of acylamino groups to amino groups by employing basic conditions. The usual acylamino groups are the formamido and ($C_{1-4}$-alkyl)carbonylamino groups. The preferred acyl groups are the formyl and acetyl groups, particularly the latter.

The intermediates of formula XIII, i.e., the compounds of the formula also form part of the present invention.

Representative of the compounds of formula XIII are those where Q is —$NH_2$, —$NO_2$ or acylamino, and Q' is —$NH_2$, —$NO_2$ or acylamino, with those wherein any acylamino is formylamino or ($C_{1-4}$alkyl)carbonylamino being preferred and those wherein any acylamino is formylamino or acetylamino being more preferred.

The compounds of formulae III, IV, VI and, especially, I are useful as anionic dyestuffs for dyeing substrates, whether textile or non-textile, dyeable using anionic dyes. Particular substrates are natural and regenerated cellulose, natural and synthetic polyamide, polyurethane, basic modified polypropylene, anodised aluminum and leather. Textile substrates may be in such forms as fibres, threads, filaments, non-wovens, felts, carpets, knitted, woven and finished goods. As examples of the natural fibre materials may be given cotton, wool and silk and of the synthetic fibre materials may be given nylon and basically modified polypropylene. Of particular interest is the use of the dyes, particularly the compounds of formula I, for the dyeing of cotton, cellulose non-woven fabrics, paper and leather, especially

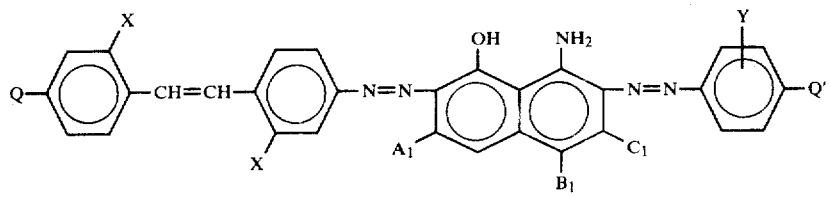

(XIII), wherein
each of $A_1$, $B_1$ and $C_1$ is independently hydrogen or —$SO_3M$, with the proviso that when $A_1$ is —$SO_3M$, one of $B_1$ and $C_1$ is —$SO_3M$ and the other is hydrogen and when $A_1$ is hydrogen, $B_1$ is —$SO_3M$ and $C_1$ is hydrogen, Q is —$NH_2$, —$NO_2$, acylamino or $K_3$—N=N—, wherein $K_3$ is a coupling component radical free of diazotizable amino groups, Q is —$NH_2$, —$NO_2$, acylamino or —N=N—$K_4$, wherein $K_4$ is a coupling component radical free of diazotizable amino groups, each X is hydrogen or —$SO_3M$, with the proviso that the two X's are the same, Y is hydrogen, $C_{1-4}$alkyl, $C_{1-4}$alkoxy, hydroxy, fluoro, chloro, bromo, —COOM or —$SO_3M$, and each M is hydrogen or a non-chromophoric cation, with the proviso that when Q is $K_3$—N=N—, Q' is —$NH_2$, —$NO_2$ or acylamino, leather. The dyes may be applied in conventional manner, depending on the nature of the substrate to be dyed, e.g. using exhaust, pad-dyeing and printing techniques, in conventional amounts, e.g. up to the saturation level of the substrate. The dyeings obtained, depending on the particular dye employed, are dark blue, dark green and deep black and have satisfactory fastness properties. The dyes themselves are well soluble in water, show good resistance to acid and, especially on paper and leather, have relatively high substantivity and give good penetration dyeings with leather.

The dyes may be employed as such or in dye preparation form, optionally in admixture with other dyes.

The following Examples, in which all parts and percentages are by weight and the temperatures are in degrees centigrade, illustrate the invention.

EXAMPLE 1

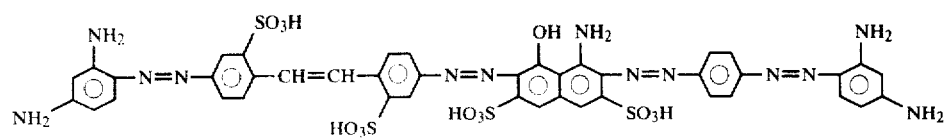

138 Parts of para-nitroaniline are diazotised in the usual manner with hydrochloric acid and sodium nitrite and are coupled at a pH of 1-3 with 319 parts of 1-amino-8-hydroxynaphthalene-3,6-disulphonic acid. The diazo compound derived from 400 parts of 4-amino-4'-nitrostilbene-2,2'-disulphonic acid is coupled at a pH of 9.5 with the monoazo compound obtained above. The dinitrodisazo compound thus obtained is reduced in the reaction mixture at 40° with a solution of 234 parts of sodium sulphide in water. The dyestuff is separated by sprinkling in common salt and adjusting the pH to 1.5. The dyestuff obtained is mixed with dilute hydrochloric acid and is tetrazotised by adding dropwise 140 parts of sodium nitrite solution. 216 parts of 1,3-diaminobenzene, dissolved in water, are added to the tetrazotised dyestuff, and they are coupled at a pH of 5-10. The dyestuff obtained is precipitated with acid. It is a dark powder which dyes leather, paper, natural and synthetic polyamides and cotton in deep black shades.

If 2-chloro-4-nitroaniline or 2-sulpho-4-nitroaniline is used instead of p-nitroaniline, black dyestuffs with similar properties are obtained. If 1-amino-3-hydroxybenzene or 3-hydroxy-2'-methyldiphenylamine is used instead of 1,3-diaminobenzene, a black dye with similar properties is obtained. If 1,3-diamino-4-sulphobenzene is used instead of 1,3-diaminobenzene, an easily soluble dyestuff is obtained with the same properties.

EXAMPLE X (Production of Coupling Component (fg))

276 Parts of salicyclic acid, 100 parts of 20% sodium hydroxide solution and 42 parts of paraformaldehyde are boiled at reflux for 10 hours. The resulting viscous melt, which no longer smells of formaldehyde, is dissolved with 2000 parts of 3% sodium hydroxide solution, 300 Parts of 30% hydrochloric acid are added quickly at 25° with good stirring. The condensation product in the form of a white precipitate is filtered off by suction, washed three times with water, dried at 100° in a vacuum and then ground to a powder.

Yield: 280 parts of a white powder with an acid equivalent weight of 160.

In Table 1 is given the structure of these and further dyestuffs which may be produced similarly to that of Example 1 and in the form of the free acid correspond to formula I, wherein the X's, $A_1$ and $C_1$ are sulpho, $B_1$ is hydrogen and Y, $K_1$ and $K_2$ have the definitions given in the corresponding columns, and M signifies hydrogen. Y being in meta-position to the $K_2$-azo group.

TABLE 1

| Ex. No. | Y | $-K_1 = -K_2$ | Shade of dyeing on leather |
|---|---|---|---|
| 2 | —H | 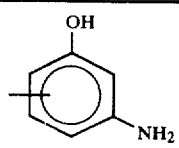 | black |
| 3 | —H | 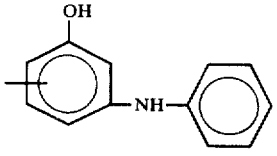 | " |
| 4 | —H | 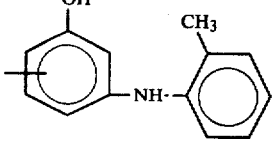 | " |
| 5 | —H | 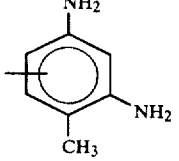 | " |
| 6 | —H | 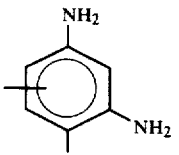 | " |
| 7 | —H | 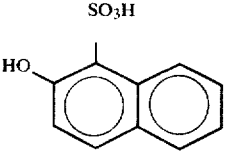 | blue |

TABLE 1-continued

| Ex. No. | Y | —K₁ = —K₂ | Shade of dyeing on leather |
|---|---|---|---|
| 8 | —H | (2-hydroxy-1-methyl-naphthalene-6-sulfonic acid) | " |
| 9 | —H | CH₃—CO—CH—CO—NH—phenyl | green |
| 10 | —H | (1-hydroxy-7-amino-naphthalene with CH₃ and SO₃H) | blue |
| 11 | —H | (1-hydroxy-7-phenylamino-naphthalene with CH₃ and SO₃H) | " |
| 12 | —H | (8-amino-1-hydroxy-naphthalene-3,6-disulfonic acid with CH₃) | " |
| 13 | —H | (1-hydroxy-8-acetamido-naphthalene-3,6-disulfonic acid with CH₃) | " |
| 14 | —H | (1,8-dihydroxy-naphthalene-3,6-disulfonic acid with CH₃) | " |
| 15 | —H | (methyl-amino-naphthalene-sulfonic acid) | " |
| 16 | —H | (methyl-phenylamino-naphthalene-sulfonic acid) | " |
| 17 | —H | (methyl-diamino-naphthalene) | " |

TABLE 1-continued
| Ex. No. | Y | −K₁ = −K₂ | Shade of dyeing on leather |
|---|---|---|---|
| 18 | −H | 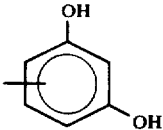 | dark green |
| 19 | −H | 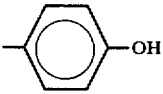 | green |
| 20 | −H | 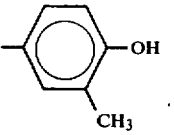 | " |
| 21 | −H | 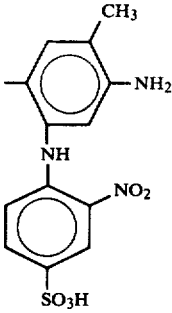 | " |
| 22 | −H | 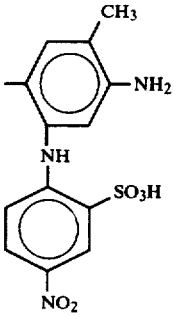 | dark green |
| 23 | −H | 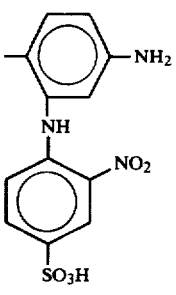 | " |
| 24 | −H | 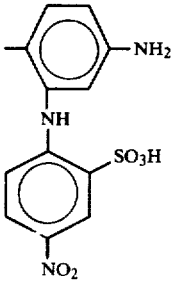 | " |

TABLE 1-continued

| Ex. No. | Y | —K₁ = —K₂ | Shade of dyeing on leather |
|---|---|---|---|
| 25 | —H | [pyrazolone with OH, CH₃, N-phenyl] | green |
| 26 | —H | [pyrazolone with OH, CH₃, N-(4-sulfophenyl)] | " |
| 27 | —H | [benzene with CH₃, COOH, OH (salicylic acid derivative)] | " |
| 28 | —H | [benzene with CH₃, OH, COOH] | " |
| 29 | —H | Product of Example X, above, used in an amount corresponding to 1 molecule of salicyclic acid originally condensed per diazonium group. | " |
| 30 | —H | [8-hydroxyquinoline derivative] | black |
| 31 | —SO₃H | [toluene-2,4-diamine] | " |
| 32 | —SO₃H | [aminophenol] | " |
| 33 | —SO₃H | [aminonaphthalenesulfonic acid] | blue |
| 34 | —SO₃H | [N-phenyl naphthylamine sulfonic acid] | " |

TABLE 1-continued

| Ex. No. | Y | —K₁ = —K₂ | Shade of dyeing on leather |
|---|---|---|---|
| 35 | —SO₃H | [naphthalene with OH, HO₃H, NH₂] | " |
| 36 | —SO₃H | CH₃—CO—CH—CO—NH—[phenyl] | green |
| 37 | —SO₃H | [pyrazolone with OH, N-phenyl, CH₃] | " |
| 38 | —Cl | [benzene with NH₂, NH₂, CH₃] | black |
| 39 | —Cl | [naphthalene with HO, CH₃, SO₃H] | blue |
| 40 | —SO₃H | " | " |
| 41 | —Cl | [benzene with NH₂, OH, CH₃] | black |
| 42 | —Cl | [phenyl with OH, CH₃, NH—phenyl-CH₃] | " |
| 43 | —Cl | [naphthalene with CH₃, NH₂, SO₃H] | blue |
| 44 | —Cl | [naphthalene with CH₃, NH-phenyl, SO₃H] | " |
| 45 | —Cl | [naphthalene with OH, CH₃, NH₂, SO₃H] | " |

TABLE 1-continued
| Ex. No. | Y | $-K_1 = -K_2$ | Shade of dyeing on leather |
|---|---|---|---|
| 46 | —Cl | 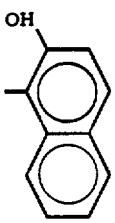 | " |
| 47 | —Cl | $CH_3-CO-CH-CO-NH-$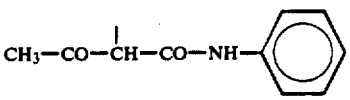 | green |
| 48 | —Cl | 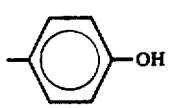 | " |
| 49 | —Cl | 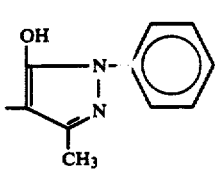 | " |
| 50 | —Cl | Same as in Example 29 | dark green |
| 51 | —OCH$_3$ | 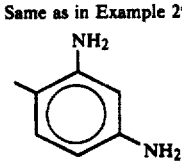 | black |
| 52 | —OCH$_3$ | 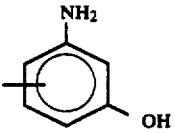 | " |
| 53 | —OCH$_3$ | 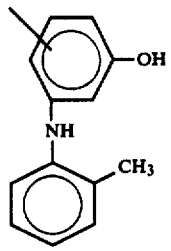 | " |
| 54 | —OCH$_3$ | 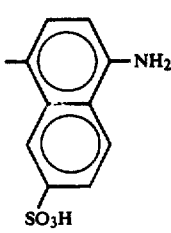 | blue |
| 55 | —OCH$_3$ | 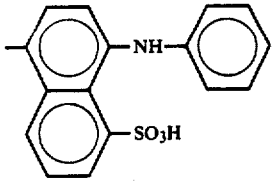 | " |

TABLE 1-continued

| Ex. No. | Y | −K₁ = −K₂ | Shade of dyeing on leather |
|---|---|---|---|
| 56 | −OCH₃ | (2-hydroxy-3-methylnaphthalene) | " |
| 57 | −OCH₃ | (1-hydroxy-2-methyl-3-sulfo-7-aminonaphthalene) | " |
| 58 | −OCH₃ | (1-hydroxy-2-methyl-3-sulfo-7-phenylaminonaphthalene) | " |
| 59 | −OCH₃ | CH₃—CO—CH—CO—NH—(phenyl) | green |
| 60 | −OCH₃ | (4-methylphenol) | " |
| 61 | −OCH₃ | (1-phenyl-3-methyl-5-hydroxypyrazole) | " |
| 62 | −OCH₃ | same as Example 29 | dark green |
| 63 | −OCH₃ | (8-hydroxyquinoline) | black |
| 64 | −H | Product of Example X, above, used in an amount corresponding to 1 molecule of salicyclic acid originally condensed per diazonium group. | dark green |
| 65 | −Cl | " | " |
| 66 | −OCH₃ | " | " |
| 67 | −SO₃H | " | " |

EXAMPLE 68

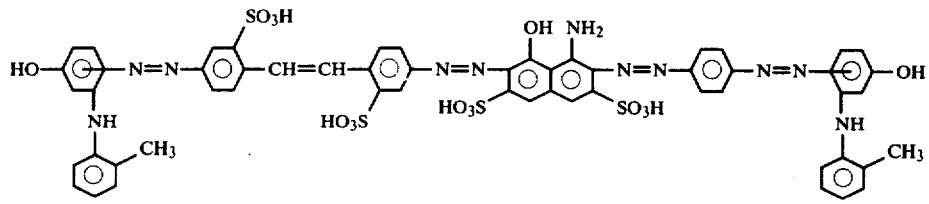

138 Parts of para-nitroaniline are diazotised in the usual manner with hydrochloric acid and sodium nitrite and are coupled at a pH of 1-3 with 319 parts of 1-amino-8-hydroxynaphthalene-3,6-disulphonic acid. The tetrazo compound consisting of 370 parts of 4,4'-diaminostilbene-2,2'-disulphonic acid is coupled on one side at a pH of 5-10 with the monoazo compound obtained as above. After coupling, 199 parts of 3-hydroxy-2'-methyldiphenylamine, dissolved in water, and caustic soda are added to the diazodisazo compound thus obtained and coupling is brought to an end at a pH of 10. The nitrotrisazo compound obtained is reduced in the reaction mixture at 40° with a solution of 117 parts of sodium sulphide in water. The dyestuff is separated by sprinkling in common salt and adjusting the pH to 1.5. The dyestuff thus obtained is mixed with dilute hydrochloric acid and is diazotised by adding in drops 70 parts of sodium nitrite solution. 199 parts of 3-hydroxy-2'-methyldiphenylamine, dissolved in water, and caustic soda are added to the diazotised dyestuff and are coupled at a pH of 10.

The dystuff thus obtained is precipitated with acid. It is a black powder which dyes leather, paper, natural or synthetic polyamides or cotton in deep black shades.

If 2-chloro-4-nitroaniline, 2-sulpho-4-nitroaniline or 2-methoxy-4-nitroaniline is used instead of p-nitroaniline, black dyestuffs with equally good properties are obtained. In Table 2 is given the structure of further dyestuffs which may be produced similarly to that of Example 68 and which in the form of the free acid correspond to formula I wherein the X's, $A_1$ and $C_1$ are sulpho, $B_1$ is hydrogen and Y and —$K_1$ and —$K_2$ have the definitions given in the corresponding columns and M signifies hydrogen.

Table 2

| Ex. No. | —Y | $K_1$ | $K_2$ | Shade of dyeing on leather |
|---|---|---|---|---|
| 69 | —H | (3-hydroxy-2'-methyldiphenylamine group with OH, NH, CH₃) | (phenyl with NH₂, NH₂, CH₃) | black |
| 70 | —H | " | (phenyl with NH₂, OH) | " |
| 71 | —H | " | (quinoline with OH) | " |
| 72 | —H | " | (phenyl with NH₂, NH₂, SO₃H) | " |
| 73 | —H | " | (phenyl with NH₂, NH₂, CH₃) | " |
| 74 | —H | " | (phenyl with OH, OH) | " |
| 75 | —H | " | (pyrazole with OH, CH₃, N-phenyl) | " |

Table 2-continued
| Ex. No. | —Y | K₁ | K₂ | Shade of dyeing on leather |
|---|---|---|---|---|
| 76 | —H | " | 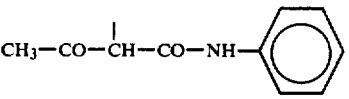 | " |
| 77 | —H | " | 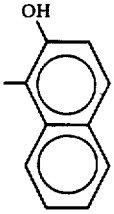 | blue-black |
| 78 | —H | " | 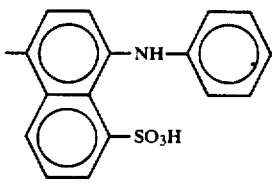 | " |
| 79 | —H | " | 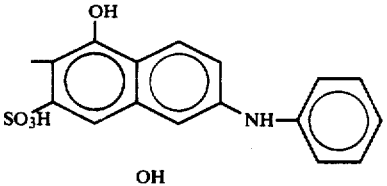 | " |
| 80 | —H | " | 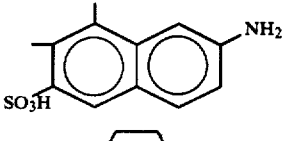 | " |
| 81 | —H | " | 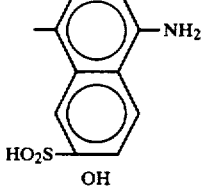 | " |
| 82 | —H | 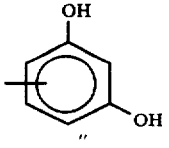 | 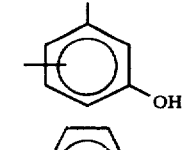 | green |
| 83 | —H | " |  | " |
| 84 | —H | " | 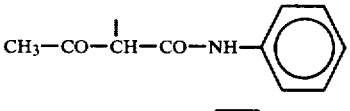 | " |
| 85 | —H | " | 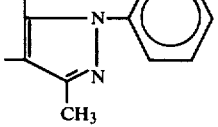 | " |
| 86 | —H | " | 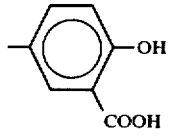 | " |

Table 2-continued
| Ex. No. | −Y | K₁ | K₂ | Shade of dyeing on leather |
|---|---|---|---|---|
| 87 | −H | " | 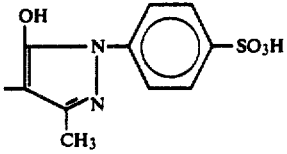 | " |
| 88 | −H | " | same as Example 29 | " |
| 89 | −H | " | 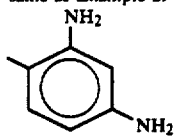 | black |
| 90 | −H | " | 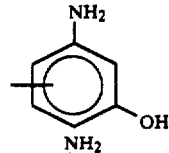 | " |
| 91 | −H | " | 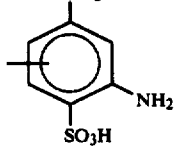 | " |
| 92 | −H | " | 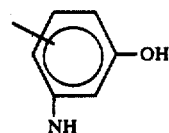 | " |
| 93 | −H | " | 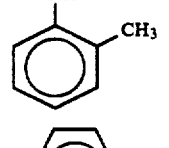 | " |
| 94 | −H | " | 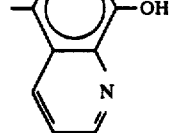 | " |
| 95 | −H | " | 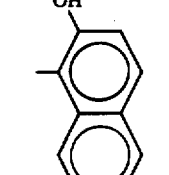 | " |
| 96 | −H | " | same as Example 29 | " |
| 97 | −H | " | 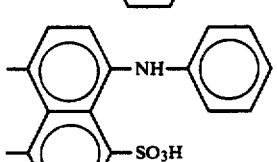 | " |

Table 2-continued

| Ex. No. | −Y | K₁ | K₂ | Shade of dyeing on leather |
|---|---|---|---|---|
| 98 | −H | " | [naphthalene with OH, NH₂, SO₃H substituents] | " |
| 99 | −H | " | [naphthalene with NH₂, SO₃H substituents] | dark green |
| 100 | −H | " | [benzene with CH₃, NH₂, NH-linked to nitrobenzene with NO₂ and SO₃H] | " |
| 101 | −H | [benzene with OH] | [benzene with OH] | green |
| 102 | −H | " | [benzene with two OH groups (resorcinol)] | " |
| 103 | −H | " | $CH_3-CO-CH-CO-NH-$[phenyl] | " |
| 104 | −H | " | [pyrazolone with OH, CH₃, N-phenyl] | " |
| 105 | −H | " | [benzene with OH and NH₂] | green-black |
| 106 | −H | [benzene with OH] | [benzene with NH₂, CH₃, NH₂] | black |

Table 2-continued
| Ex. No. | −Y | K₁ | K₂ | Shade of dyeing on leather |
|---|---|---|---|---|
| 107 | −H | " | 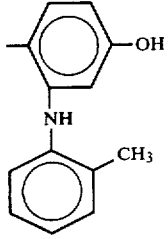 | " |
| 108 | −H | " | 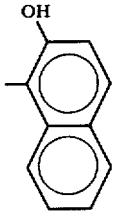 | " |
| 109 | −H | " | 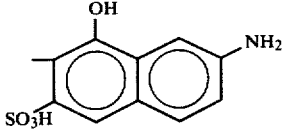 | " |
| 110 | −H | " | 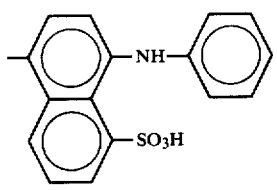 | " |
| 111 | −H | 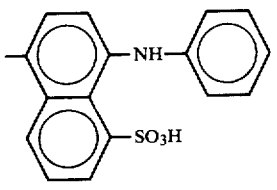 | 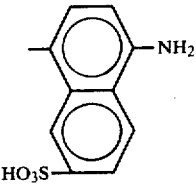 | blue |
| 112 | −H | " | 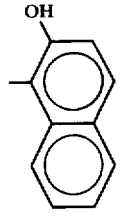 | " |
| 113 | −H | " | 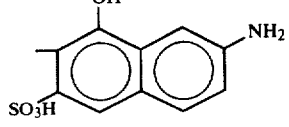 | " |
| 114 | −H | " | 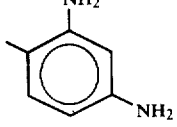 | blue-black |

Table 2-continued

| Ex. No. | −Y | K₁ | K₂ | Shade of dyeing on leather |
|---|---|---|---|---|
| 115 | −H | " | [3-methyl-4-(2-methyl-phenylamino)phenol structure with OH] | " |
| 116 | −H | " | [resorcinol / dihydroxybenzene structure with HO, HO] | black |
| 117 | −H | " | [methylphenol with OH] | " |
| 118 | −H | " | CH₃—CO—CH—CO—NH—phenyl (acetoacetanilide) | " |
| 119 | −H | " | [1-phenyl-3-methyl-5-pyrazolone structure with OH, N, N, CH₃] | " |
| 120 | −H | same as Example 29 | CH₃—CO—CH—CO—NH— | green |
| 121 | −H | same as Example 29 | [resorcinol derivative with OH, OH] | " |
| 122 | −H | same as Example 29 | [methylphenol with OH] | " |
| 123 | −H | same as Example 29 | [salicylic acid derivative with OH, COOH] | " |
| 124 | −H | same as Example 29 | [1-phenyl-3-methyl-5-pyrazolone with OH, N, N, CH₃] | " |
| 125 | −H | same as Example 29 | [2,4-diaminotoluene with NH₂, NH₂] | black |

Table 2-continued
| Ex. No. | —Y | K₁ | K₂ | Shade of dyeing on leather |
|---|---|---|---|---|
| 126 | —H | same as Example 29 | 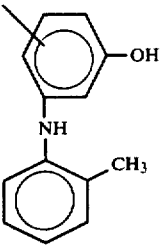 | " |
| 127 | —H | same as Example 29 | 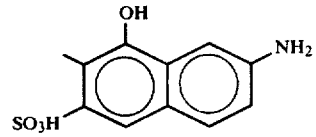 | " |
| 128 | —H | same as Example 29 | 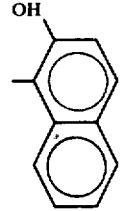 | " |
| 129 | —H | 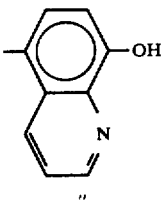 | 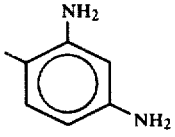 | " |
| 130 | —H | " | 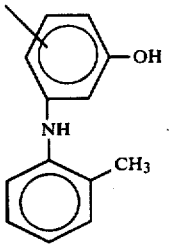 | " |
| 131 | —H | " | 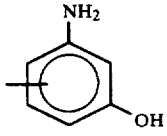 | " |
| 132 | —H | " | 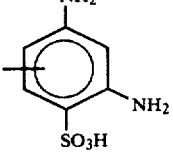 | " |
| 133 | —H | 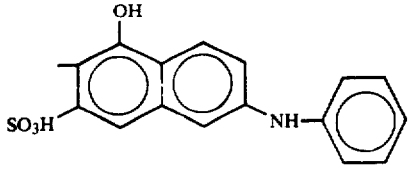 | 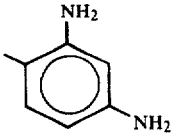 | blue-black |

Table 2-continued
| Ex. No. | —Y | K₁ | K₂ | Shade of dyeing on leather |
|---|---|---|---|---|
| 134 | —H | " | 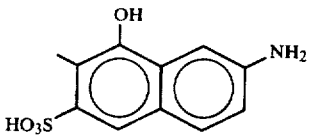 | blue |
| 135 | —H | " | 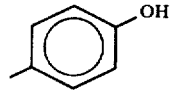 | black |
| 136 | —H | 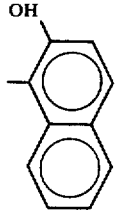 | 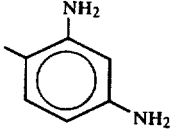 | blue-black |
| 137 | —H | " | 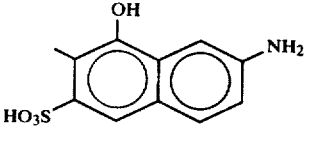 | blue |
| 138 | —H | " | 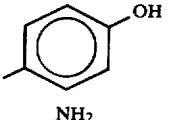 | black |
| 139 | —H | 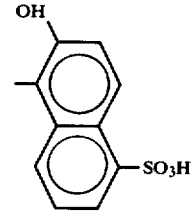 | 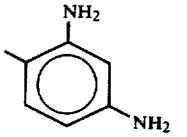 | blue-black |
| 140 | —H | " | 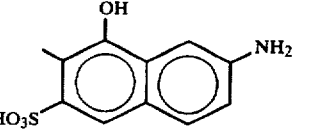 | blue |
| 141 | —H | " | 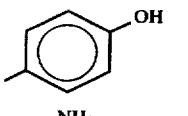 | black |
| 142 | —H | 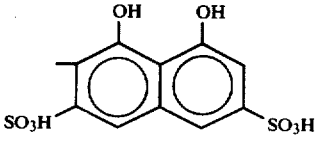 | 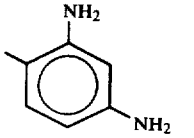 | blue-black |
| 143 | —H | " | 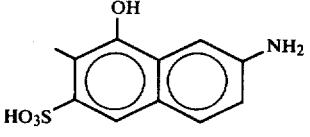 | blue |
| 144 | —H | " | 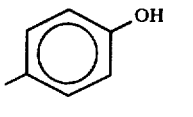 | black |

Table 2-continued

| Ex. No. | —Y | K₁ | K₂ | Shade of dyeing on leather |
|---|---|---|---|---|
| 145 | —H | 2-hydroxy-5-methyl-NHCOCH₃-phenyl | 2,4-diaminotoluene | blue-black |
| 146 | —H | " | 1-hydroxy-2-methyl-6-amino-3-sulfo-naphthalene | blue |
| 147 | —H | " | p-cresol | black |
| 148 | —H | 2-methoxy-4-methyl-NH—CH₂SO₃H-phenyl | 2,4-diaminotoluene | blue-black |
| 149 | —H | " | 1-hydroxy-2-methyl-6-amino-3-sulfo-naphthalene | blue |
| 150 | —H | " | p-cresol | black |
| 151 | —H | 1-hydroxy-2-methyl-6-(NH—CH₂SO₃H)-3-sulfo-naphthalene | 2,4-diaminotoluene | blue-black |
| 152 | —H | " | 1-hydroxy-2-methyl-6-amino-3-sulfo-naphthalene | blue |
| 153 | —H | " | p-cresol | black |
| 154 | —H | 1-hydroxy-8-NHCOCH₃-3,6-disulfo-naphthalene | 2,4-diaminotoluene | blue-black |
| 155 | —H | " | 1-hydroxy-2-methyl-6-amino-3-sulfo-naphthalene | blue |
| 156 | —H | " | p-cresol | black |

Table 2-continued

| Ex. No. | —Y | K₁ | K₂ | Shade of dyeing on leather |
|---|---|---|---|---|
| 157 | —H | (OH, N-phenyl, N, CH₃ pyrazole structure) | 2-methyl-1,4-diaminobenzene (NH₂, NH₂) | blue-black |
| 158 | —H | " | 1-hydroxy-2-methyl-6-amino-naphthalene-sulfonic acid (OH, NH₂, HO₃S) | blue |
| 159 | —H | " | 2-methylphenol (OH) | black |

DYEING EXAMPLE A

100 Parts of newly tanned and neutralised chromium grain leather are milled for 30 minutes in the dye tub in a liquor consisting of 250 parts of water at 55° and 1 part of the dyestuff of Example 1. They are treated for a further 30 minutes in the same bath with 2 parts of an anionic fat-liquor based on sulphonated train oil, and the leathers are dried and curried in the usual manner. A very evenly dyed black leather is obtained.

DYEING EXAMPLE B 100 parts of calf suede are milled for 4 hours in the dye tub with 1000 parts of water and 2 parts of ammonia, and they are subsequently dyed in a new bath. 500 parts of water at 55°, 2 parts of ammonia, 10 parts of the dissolved dyestuff of Example 1 are dyed for 1½ hours in the dye tub, together with the calf leather which has already been milled. In order to exhaust the dyebath, 4 parts of formic acid (85%) are slowly added, the dyeing continues until the dyestuff has been fixed completely. The suede leathers which are rinsed, dried and curried in the normal manner result in a very evenly dyed, deep black suede, after buffing the suede side.

DYEING EXAMPLE C

100 Parts of lamb's leather, chromium-vegetable tanned, and 10 parts of the dyestuff of Example 1 are milled for 45 minutes in the dye tub in a liquor consisting of 1000 parts of water at 55° and 1.5 parts of an anionic emulsion of spermaceti oil, and the dyestuff is fixed on the leather by slowly adding 5 parts of formic acid (85%) for 30 minutes. After the usual drying and currying processes, a leather is obtained in a very even deep black shade.

DYEING EXAMPLE D

A solution of 20 parts of the dyestuff of Example 1 in 847 parts of water, 150 parts of ethylene glycol and 3 parts of formic acid (85%) is applied by spraying, plushing and coating to the grain side of a buffed, compound-tanned cow hide. The leather is dried and curried under mild conditions. A leather is obtained in a deep black shade, with very good fastness properties.

DYEING EXAMPLE E 260 ml of water at 50°-60° are placed in a 500 ml dye beaker which is located in a heatable water bath, and 10 ml of 10% sodium sulphate solution, as well as 1 ml of 10% sodium carbonate solution are added. 0.25 g of the dyestuff of Example 1 are made into a good paste with 2 ml of cold water, and 30 ml of warm water (50°-60°) are added; the dyestuff then dissolves. The dye solution is added to the prepared bath and 10 g of cotton fabric are kept in constant movement in this dyebath. The temperature of the dye bath is increased over the course of 30 minutes to 85°-90° and dyeing continues at this temperature for 60 minutes. The dyed material is removed from the dyebath, the adhering liquor is removed by wringing out, and the material is rinsed for 5-10 minutes in cold water and dried at 60°-70°.

DYEING EXAMPLE F PAPER (a) 100 parts of chemically bleached sulphite cellulose (of conifer or hard-wood) are ground in a hollander in 2000 parts of water. 4 parts of the dyestuff of Example 1 are added to this pulp as a powder or in solution. After 15 minutes, sizing takes place, and subsequently fixation. Paper produced from this pulp has a deep black dyeing with good fastness to the wet and to light.

(b) 70 parts of chemically bleached sulphite cellulose (of conifer wood) and 30 parts of chemically bleached sulphite cellulose (of birchwood) are beaten in a pulper in 2000 parts of water. 0.4 parts of the dyestuuf of Example 1 are sprinkled into this pulp or are added as a solution. Paper is produced from this pulp after 20 minutes. The paper produced from this pulp is dyed grey and has good colour fastness.

By replacing the dyestuff of Example 1 in the above Examples A-F by the corresponding amount of one of the dyestuffs of Examples 2 to 159, further dyeings are obtained.

In the above dyeing examples, the dyestuffs are used in blended form with sodium carbonate.

What is claimed is:

1. A compound of the formula

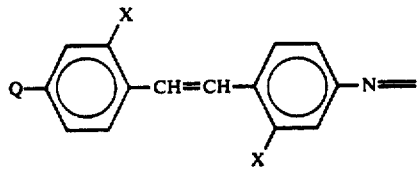

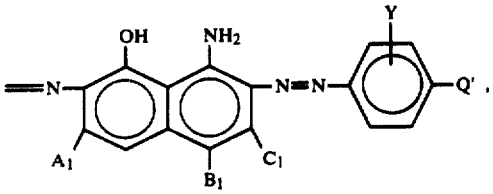

wherein
each of $A_1$, $B_1$ and $C_1$ is independently hydrogen or —$SO_3M$, with the proviso that when $A_1$ is —$SO_3M$, one of $B_1$ and $C_1$ is —$SO_3M$ and the other is hydrogen and when $A_1$ is hydrogen, $B_1$ is —$SO_3M$ and $C_1$ is hydrogen, Q is —$NH_2$, —$NO_2$, acylamino or $K_3$—N=N—, wherein $K_3$ is a coupling component radical free of diazotizable amino groups, Q' is —$NH_2$—$NO_2$, acylamino or —N=N—$K_4$, wherein $K_4$ is a coupling component radical free of diazotizable amino groups, each X is hydrogen or —$SO_3M$, with the proviso that the two X's are the same, Y is hydrogen, $C_{1-4}$alkyl, $C_{1-4}$alkoxy, hydroxy, fluoro, chloro, bromo, —COOM or —$SO_3M$, and each M is hydrogen or a non-chromophoric cation, with the proviso that when Q is $K_3$—N=N—, Q' is —$NH_2$ or acylamino.

2. A compound according to claim 1 wherein Q' is —$NH_2$ when Q is $K_3$—N=N—.

3. A compound according to claim 2 having the formula

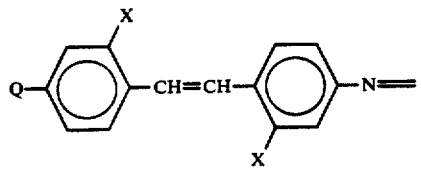

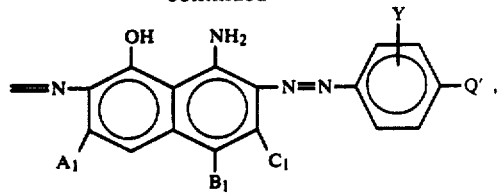

wherein
each of $A_1$, $B_1$ and $C_1$ is independently hydrogen or —$SO_3M$, with the proviso that when $A_1$ is —$SO_3M$, one of $B_1$ and $C_1$ is —$SO_3M$ and the other is hydrogen and when $A_1$ is hydrogen, $B_1$ is —$SO_3M$ and $C_1$ is hydrogen, Q is —$NH_2$, —$NO_2$ or acylamino, Q' is —$NH_2$, —$NO_2$ or acylamino, each X is hydrogen or —$SO_3M$, with the proviso that the two X's are the same, Y is hydrogen, $C_{1-4}$alkyl, $C_{1-4}$alkoxy, hydroxy, fluoro, chloro, bromo, —COOM or —$SO_3M$, and each M is hydrogen or a non-chromophoric cation.

4. A compound according to claim 3 wherein
Q is —$NH_2$, —$NO_2$, formamido or ($C_{1-4}$alkyl)carbonylamino, and
Q' is —$NH_2$, —$NO_2$, formamido or ($C_{1-4}$alkyl)carbonylamino.

5. A compound according to claim 4 wherein
Q is —$NH_2$, —$NO_2$, formamido or acetamido, and
Q' is —$NH_2$, —$NO_2$, formamido or acetamido.

6. A compound according to claim 5 wherein Q is —$NO_2$, formamido or acetamido.

7. A compound according to claim 6 wherein Q' is —$NH_2$.

8. A compound according to claim 5 wherein
Q is —$NH_2$, and
Q' is —$NO_2$, formamido or acetamido.

9. A compound according to claim 5 wherein
Q is —$NO_2$, and
Q' is —$NO_2$.

10. A compound according to claim 9 wherein
$A_1$ is —$SO_3M$,
$B_1$ is hydrogen,
$C_1$ is —$SO_3M$,
each X is —$SO_3M$, and
Y is hydrogen.

11. A compound according to claim 5 wherein
Q is —$NH_2$, and
Q' is —$NH_2$.

12. A compound according to claim 11 wherein
$A_1$ is —$SO_3M$,
$B_1$ is hydrogen,
$C_1$ is —$SO_3M$,
each X is —$SO_3M$, and
Y is hydrogen.

* * * * *